United States Patent
Shi et al.

(10) Patent No.: US 11,632,552 B2
(45) Date of Patent: Apr. 18, 2023

(54) METHOD AND APPARATUS FOR CODING VIDEO, DEVICE AND MEDIUM

(71) Applicant: Beijing Baidu Netcom Science and Technology Co., Ltd., Beijing (CN)

(72) Inventors: Le Shi, Beijing (CN); Wenpeng Ding, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 0 days.

(21) Appl. No.: 17/350,303

(22) Filed: Jun. 17, 2021

(65) Prior Publication Data

US 2021/0368179 A1    Nov. 25, 2021

(30) Foreign Application Priority Data

Oct. 30, 2020    (CN) .......................... 202011197402.7

(51) Int. Cl.
*H04N 19/136*  (2014.01)
*H04N 19/172*  (2014.01)
*H04N 19/114*  (2014.01)

(52) U.S. Cl.
CPC ......... *H04N 19/136* (2014.11); *H04N 19/114* (2014.11); *H04N 19/172* (2014.11)

(58) Field of Classification Search
CPC ... H04N 19/136; H04N 19/172; H04N 19/114
See application file for complete search history.

(56) References Cited

U.S. PATENT DOCUMENTS

| | | |
|---|---|---|
| 2008/0232468 A1 | 9/2008 | Kwon et al. |
| 2018/0184084 A1 | 6/2018 | Jeon et al. |

OTHER PUBLICATIONS

Dumitras, Adriana et al., "I/P/B frame type decision by collinearity of displacements," International Conference on Image Processing, vol. 4, pp. 2769-2772 (2004).

Liu, Zhenyu, et al., "Optimize x265 Rate Control: An Exploration of Lookahead in Frame Bit Allocation and Slice Type Decision," IEEE Transactions on Image Processing, vol. 28, No. 5, pp. 2558-2573 (2019).

UKIPO Combined Search and Examination Report dated Mar. 3, 2022 in related GB Patent Application No. 2108279.7 (nine pages).

*Primary Examiner* — Kyle M Lotfi
(74) *Attorney, Agent, or Firm* — Kilpatrick Townsend & Stockton LLP

(57) ABSTRACT

A method and apparatus for coding a video, device and medium are provided. An implementation of the method include: determining a first video frame structure and a second video frame structure based on a pre-set threshold for a B-frame number; determining a target video frame structure based on the first video frame structure, the second video frame structure, and a pre-set condition; and coding video frames in a to-be-coded video frame sequence according to the target video frame structure.

18 Claims, 5 Drawing Sheets

METHOD AND APPARATUS FOR CODING VIDEO, DEVICE AND MEDIUM

CROSS-REFERENCE TO RELATED APPLICATIONS

This application claims priority to Chinese Patent Application No. 202011197402.7, filed with the China National Intellectual Property Administration (CNIPA) on Oct. 30, 2020, the content of which is incorporated herein by reference in its entirety.

TECHNICAL FIELD

The present disclosure relates to the field of computer technology, particularly to the field of video coding, and more particularly to a method and apparatus for coding a video, device and medium.

BACKGROUND

At present, when a device codes a video, it has to construct video frames of a plurality of frame types to form consecutive video pictures. The frame types may include I frame, P frame, B frame, and so on.

Nowadays, for the determination of frame type of each video frame in a video coding process, a fixed combination of frame types may be designated in advance, and video coding is performed according to the fixed combination of frame types. Alternatively, it may also traversal search a possibility of all combinations of frame types, and then determine an optimal combination of frame types from all of the combinations of frame types, and perform video coding according to the optimal combination of frame types.

SUMMARY

A method, apparatus, device and medium for coding a video are provided.

According to a first aspect, some embodiments of the present disclose provide a method for coding a video. The method includes: determining a first video frame structure and a second video frame structure based on a pre-set threshold for a B-frame number; determining a target video frame structure based on the first video frame structure, the second video frame structure, and a pre-set condition; and coding video frames in a to-be-coded video frame sequence according to the target video frame structure.

According to a second aspect, some embodiments of the present disclosure provide an apparatus for coding a video. The apparatus includes: a first determination unit, configured to determine a first video frame structure and a second video frame structure based on a pre-set threshold for a B-frame number; a second determination unit, configured to determine a target video frame structure based on the first video frame structure, the second video frame structure, and a pre-set condition; and a video coding unit, configured to code video frames in a to-be-coded video frame sequence according to the target video frame structure.

According to a third aspect, some embodiments of the present disclosure provide an electronic device. The electronic device includes: one or more processors; and a storage apparatus, storing one or more programs thereon, the one or more programs, when executed by the one or more processors, cause the one or more processors to implement the method for coding a video according to the first aspect.

According to a fourth aspect, some embodiments of the present disclosure provide a non-transitory computer readable storage medium, storing computer instructions, the computer instructions, being used to cause the computer to perform the method for coding a video according to the first aspect.

It should be understood that the content described in this section is not intended to identify key or important features of embodiments of the present disclosure, nor is it intended to limit the scope of the present disclosure. Other features of the present disclosure will be easily understood by the following description.

BRIEF DESCRIPTION OF THE DRAWINGS

The accompanying drawings are used to better understand the present disclosure, and do not constitute a limitation to the present disclosure, in which.

DETAILED DESCRIPTION OF EMBODIMENTS

The following describes example embodiments of the present disclosure in conjunction with the accompanying drawings, which includes various details of embodiments of the present disclosure to facilitate understanding, and they should be considered as merely exemplary. Therefore, those of ordinary skill in the art should recognize that various changes and modifications may be made to the embodiments described herein without departing from the scope and spirit of the present disclosure. Also, for clarity and conciseness, descriptions of well-known functions and structures are omitted in the following description.

It should be noted that embodiments in the present disclosure and the features in embodiments may be combined with each other on a non-conflict basis. Embodiments of the present disclosure will be described below in detail with reference to the accompanying drawings and in combination with the embodiments.

Figure 1:
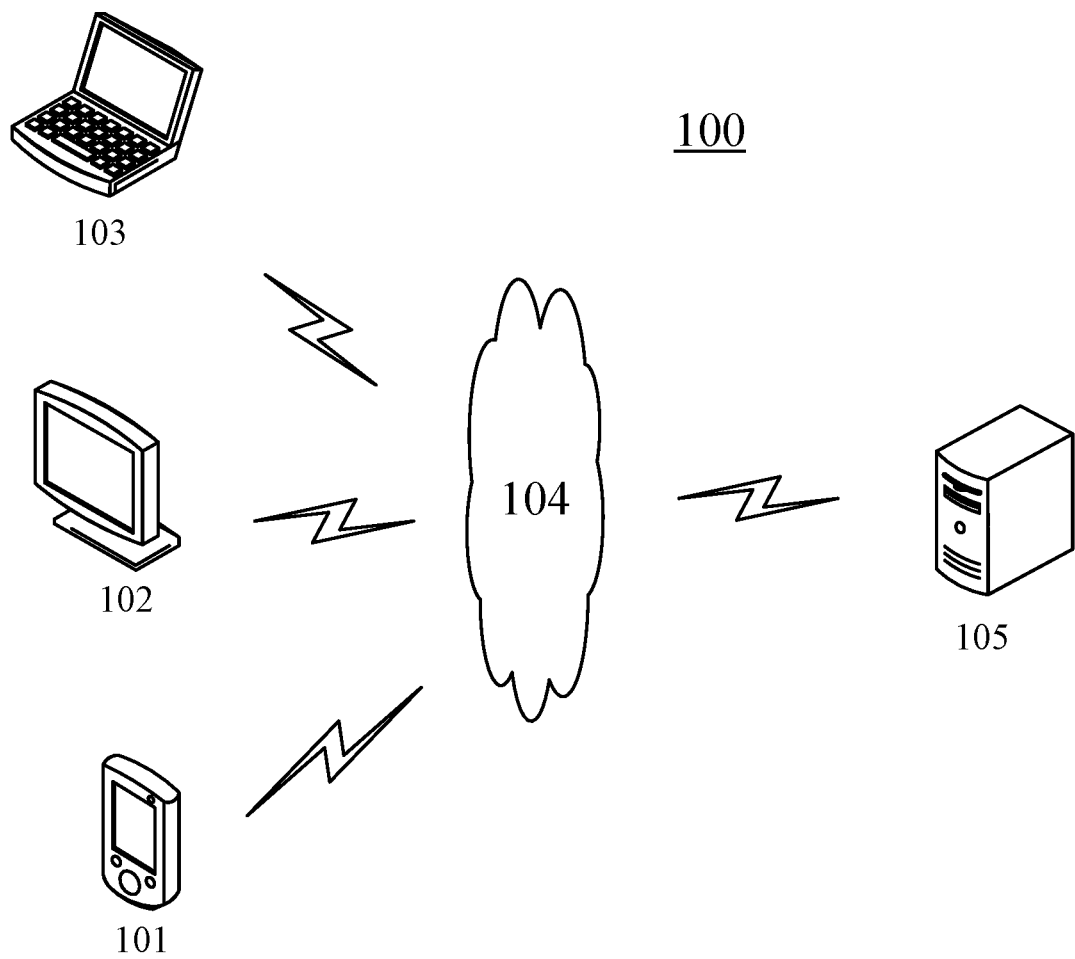
FIG. 1 is an example system architecture diagram to which an embodiment of the present disclosure may be implemented.

FIG. 1 shows an exemplary system architecture 100 to which a method for coding a video or an apparatus for coding a video may be implemented.

As shown in FIG. 1, the system architecture 100 may include terminal devices 101, 102 and 103, a network 104 and a server 105. The network 104 may be used to provide a communication link medium between the terminal devices 101, 102 and 103 and the server 105. The network 104 may include various types of connections, such as wired, wireless communication links, or optical fibers.

A user may use the terminal devices 101, 102, 103 to interact with the server 105 through the network 104 to receive or send messages, and so on. The terminal devices

101, 102, 103 may be electronic devices such as video coders, TVs, computers, and tablets. The terminal devices 101, 102, and 103 may store a to-be-coded video frame sequence, and the terminal device 101, 102, and 103 may determine a target video frame structure used in video coding process of the to-be-coded video frame sequence, and code the video frames in the to-be-coded video frame sequence according to the target video frame structure. Determining the target video frame structure may first determine a first video frame structure and a second video frame structure based on a pre-set threshold for the B-frame number, and then determine a target video frame structure based on the first video frame structure, the second video frame structure, and a pre-set condition.

The terminal devices 101, 102 and 103 may be hardware or software. When the terminal devices 101, 102 and 103 are hardware, they may be various electronic devices, including but not limited to video coders, TVs, smart phones, tablet computers, e-book readers, on-board computers, laptop computers, desktop computers and so on. When the terminal devices 101, 102 and 103 are software, they may be installed in the above-listed electronic devices. They may be implemented as a plurality of software or software modules (e.g., to provide distributed services) or as a single software or software module, which is not limited herein.

The server 105 may be a server that provides various services, for example, acquiring a coded video frame sequence sent by the terminal device 101, 102, or 103, where the coded video frame sequence is a sequence obtained by the terminal equipment 101, 102, 103 coding the video frames in the to-be-coded video frame sequence according to the target video frame structure. The server 105 may store the coded video frame sequence in a database, and when a read instruction directing to the coded video frame sequence is detected, a corresponding video may be displayed based on the coded video frame sequence.

It should be noted that the server 105 may be hardware or software. When the server 105 is hardware, it may be implemented as a distributed server cluster composed of a plurality of servers, or as a single server. When the server 105 is software, it may be implemented as a plurality of software or software modules (e.g., to provide distributed services), or as a single software or software module, which is not limited herein.

It should be noted that the method for coding a video provided in embodiments of the present disclosure is generally performed by the terminal device 101, 102 and/or 103. Correspondingly, the apparatus for coding a video is generally provided in the terminal devices 101, 102 and/or 103.

It should be understood that the number of terminal devices, networks, and servers in FIG. 1 is merely illustrative. Depending on the implementation needs, there may be any number of terminal devices, networks and servers.

Figure 2:
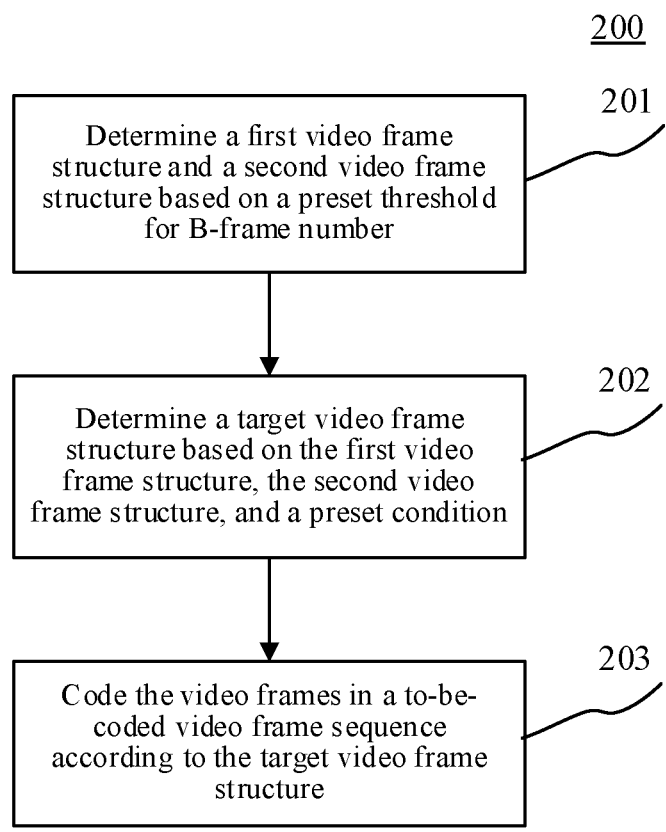
FIG. 2 is a flowchart of a method for coding a video according to an embodiment of the present disclosure.

With further reference to FIG. 2, illustrating a flow 200 of a method for coding a video according to an embodiment of the present disclosure. The method for coding a video of the present embodiment includes the following steps:

Step 201, determining a first video frame structure and a second video frame structure based on a pre-set threshold for the B-frame number.

In the present embodiment, the threshold for B-frame number may be preset, and the threshold for B-frame number may be a threshold for the maximum number of consecutive B frames. That is, the number of consecutive B frames needs to be less than the pre-set threshold for B-frame number. In addition, the first video frame structure and the second video frame structure may be determined based on the pre-set threshold for B-frame number, where the first video frame structure and the second video frame structure are different video frame structures. For example, the first video frame structure may be a PB video frame structure having the maximum threshold for B-frame number, where the PB video frame structure is a video frame structure composed of one P frame and several B frames, and the second video frame structure may be a video frame structure having a P frame inserted in a middle position of the first video frame structure. For example, the pre-set threshold for B-frame number may be 4, in this regard, based on the pre-set threshold for B-frame number, the PB video frame structure having the maximum threshold of B-frame number, i.e. PBBBB, may be determined as the first video frame structure. Further, a video frame structure obtained by inserting a P frame in the middle position of the first video frame structure, i.e. PBPBB, may be determined as the second video frame structure.

Step 202, determining a target video frame structure based on the first video frame structure, the second video frame structure, and a pre-set condition.

In the present embodiment, the preset condition may be used as a basis for identifying coding performance of a video frame structure in a pre-coding process. Based on the preset condition, a video frame structure having coding performance meeting a current video coding scenario may be selected for video coding. The preset condition may include but is not limited to: a proportion of intra-frame block in inter-frame coding exceeds a first threshold; or a ratio of an average number of bits consumed by the B frame to an average number of bits consumed by the P frame exceeds a second threshold; or a variance of an motion vector in inter-frame coding is greater than a third threshold, and the number of target blocks is greater than a fourth threshold; or a variance of the motion vector in inter-frame coding is less than a fifth threshold, and a kurtosis of the motion vector is greater than a sixth threshold, and a sum of a cumulative motion vector and a standard deviation is less than a seventh threshold, and the number of target blocks is greater than an eighth threshold. Here, the proportion of intra-frame block in inter-frame coding is a ratio of the number of intra-frame blocks to the number of blocks in this frame. The average number of bits consumed by the B frame and the average number of bits consumed by the P frame may be obtained by pre-coding a resolution-reduced video to obtain the complexity of each frame, estimating the average number of bits consumed in real coding based on a weighted result of the complexities of the frames. The variance of the motion vector in inter-frame coding is a variance value obtained based on a motion vector between a reference frame and an original frame in the inter-frame coding process. The target block is a block in which the number of bits of intra-frame blocks is greater than the threshold. The kurtosis of the motion vector refers to a kurtosis of a relative displacement between a current coding block and a best matching block in a reference image. Values of the first threshold, the second threshold, the third threshold, the fourth threshold, the fifth threshold, the sixth threshold, the seventh threshold, and the eighth threshold may be the same or different, which is not limited in the present embodiment. Alternatively, the value of the seventh threshold may be determined based on a maximum absolute value of the motion vector.

If a video frame structure meets the preset condition, it indicates that the video frame structure does not match the current video coding scenario. If the video frame structure does not meet the preset condition, it indicates that the video frame structure matches the current video coding scenario.

Alternatively, for the first video frame structure and the second video frame structure, as long as there is a video frame structure therein that does not meet the preset condition, that is, there is at least one video frame structure that matches the current video coding scenario, a target video frame structure may be determined from the first video frame structure and the second video frame structure. If both the first video frame structure and the second video frame structure meet the preset condition, that is, neither the first video frame structure nor the second video frame structure matches the current video coding scenario, in this regard, another video frame structure may be selected as the target video frame structure, and another video frame structure refer to a video frame structure other than the first video frame structure and the second video frame structure. Alternatively, a target range for traversal search for the video frame structure may be determined based on the pre-set threshold for B-frame number, and a target video frame structure may be determined based on a result of the traversal search within the target range for traversal search. Alternatively, if there are consecutive B frames in the target video frame structure, a B frame in the middle position of the consecutive B frame may be replaced with a Bref frame.

Step 203, coding the video frames in a to-be-coded video frame sequence according to the target video frame structure.

In the present embodiment, after the target video frame structure is determined, the video frames in the to-be-coded video frame sequence may be coded according to the target video frame structure. The to-be-coded video frame sequence may be the video frame sequence corresponding to a video that needs to be coded, and the video frames in the video frame sequence may be combined into a consecutive video that needs to be coded. The method for coding the video frames in a to-be-coded video frame sequence may include: determining a frame type corresponding to each video frame as a frame type in a corresponding position in the target video frame structure, and coding the video frame based on the frame type. For example, if the frame type of a video is P frame, the video frame may be compressed based on a difference between the video frame and a previous video frame whose frame type is I frame or P frame; and if the frame type of a video frame is B frame, the video frame may be compressed based on a difference between the video frame and the previous and subsequent video frames.

In the process of coding the video frames in the to-be-coded video frame sequence, when the number of consecutive B frames between a current to-be-coded video frame and a non-B frame preceding the current to-be-coded video frame is greater than the threshold for B-frame number, the frame type of the current to-be-coded video frame may be determined as P frame, and video coding is performed on the current to-be-coded video frame according to the frame type. However, when the number of consecutive B frames between the current to-be-coded video frame and the non-B frame preceding the current to-be-coded video frame is less than or equal to the threshold for B-frame number, video coding is performed on the current to-be-coded video frame according to the target video frame structure.

The method for coding a video provided in the above embodiment of the present disclosure, may determine the first video frame structure and the second video frame structure based on the pre-set threshold for B-frame number; determine the target video frame structure based on the first video frame structure, the second video frame structure, and the pre-set condition; and code the video frames in the to-be-coded video frame sequence according to the target video frame structure. This process does not need to traverse all of the video frame structures, the complexity is low, and in combination with the pre-set condition, the video frame structure can be dynamically switched, which can be applied to a variety of video coding scenarios, so that the performance of video coding according to the target video frame structure is better.

Figure 3:
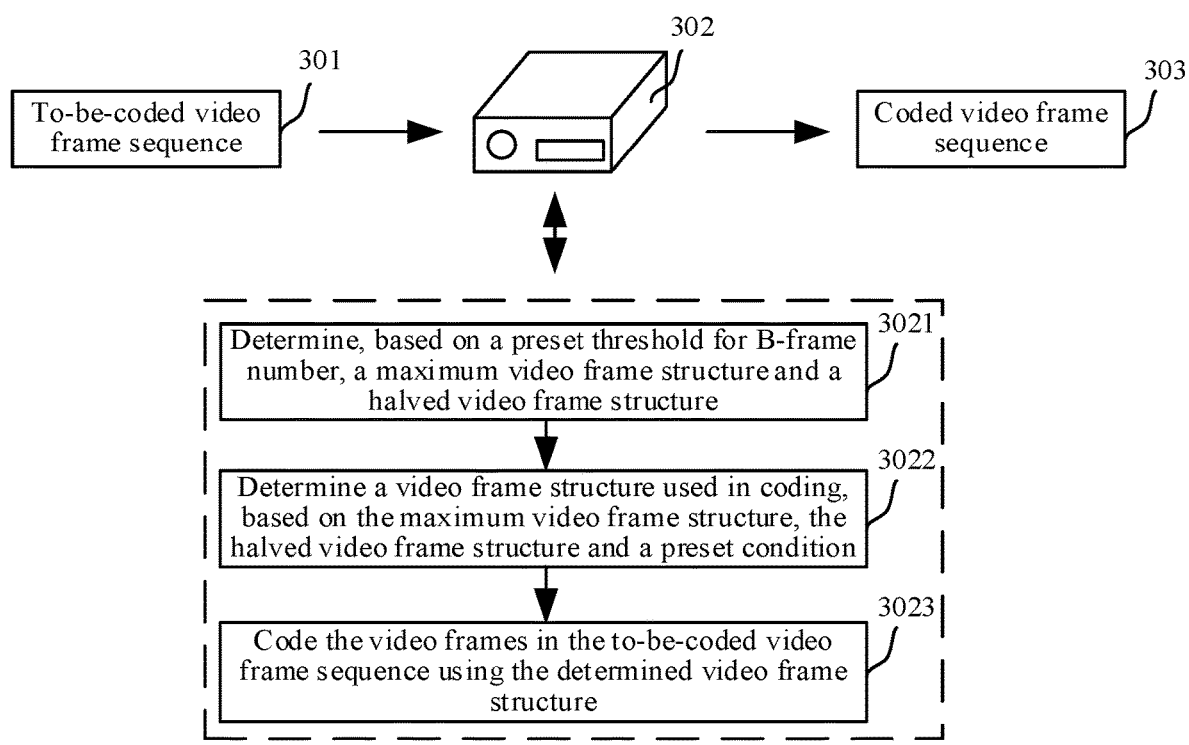
FIG. 3 is a schematic diagram of an application scenario of the method for coding a video according to an embodiment of the present disclosure.

With further reference to FIG. 3, illustrating a schematic diagram of an application scenario of the method for coding a video according to an embodiment of the present disclosure. In the application scenario of FIG. 3, the method for coding a video may be applied to a scenario where a video coder performs video coding on a target video. A video coder 302 may acquire a to-be-coded video frame sequence 301 corresponding to the target video. The to-be-coded video frame sequence 301 includes at least one video frame. After performing video coding operations, the video coder 302 may generate a coded video frame sequence 303 obtained after video coding the video frames in the to-be-coded video frame sequence. The video coder 302 may perform the following video coding operations:

Step 3021, determining a maximum video frame structure and a halved video frame structure, based on a pre-set threshold for the B-frame number.

Step 3022, determining a video frame structure used in coding, based on the maximum video frame structure, the halved video frame structure and a preset condition.

Step 3023, coding the video frames in the to-be-coded video frame sequence using the determined video frame structure.

In the present embodiment, the maximum video frame structure may be equivalent to the first video frame structure, and the halved video frame structure may be equivalent to the second video frame structure. When the video coder performs the coding operations, it may first acquire an external parameter, i.e., the preset threshold for B-frame number. The preset threshold for B-frame number is used to describe the maximum number of consecutive B frames from a non-B frame preceding the current frame to the current frame. Based on the threshold for the B-frame number, the maximum video frame structure having the maximum number of B frames may be determined. The maximum video frame structure consists one P frame and several consecutive B frames, and the number of B frames is the preset threshold for the B-frame number. Based on the preset threshold for B-frame number, a halved video frame structure may also be determined. The halved video frame structure is a video frame structure obtained by inserting a P frame in the middle position of the maximum video frame structure. Based on the maximum video frame structure, the halved video frame structure and the preset condition, the video frame structure used in coding may be determined, and then the video frames in the to-be-coded video frame sequence is coded by using the determined video frame structure, to obtain the coded video frame sequence 303. The video frame structure used in coding is referred as the target video frame structure. For the determination of the target video frame structure, reference may be made to the explanation of step 202, detailed description thereof will be omitted. For the method for coding the video frames in the to-be-coded video frame sequence according to the video frame structure used in coding, reference may be made to the explanation of step 203, and detailed description thereof will be omitted.

Figure 4:
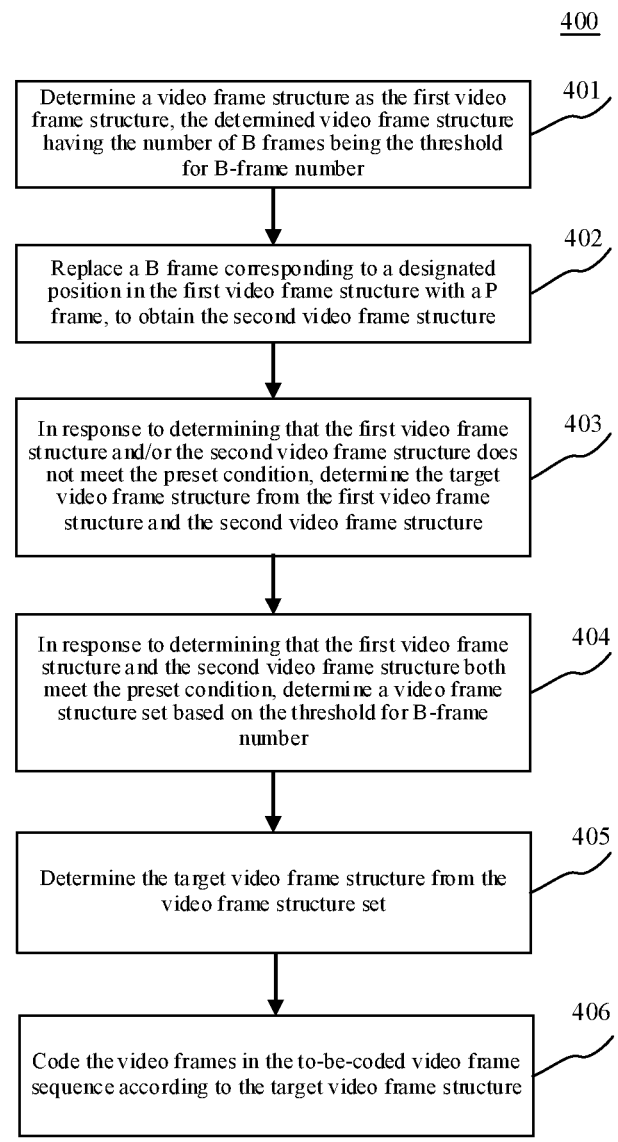
FIG. 4 is a flowchart of a method for coding a video according to another embodiment of the present disclosure.

With further reference to FIG. 4, illustrating a flow 400 of a method for coding a video according to another embodiment of the present disclosure. As shown in FIG. 4, the method for coding a video of the present embodiment may include the following steps:

Step 401, determining a video frame structure having the number of B frames being the threshold for B-frame number as the first video frame structure.

In the present embodiment, the first video frame structure may be a video frame structure composed of one P frame and B frames whose number is threshold for the B-frame number. For example, when the threshold for B-frame number is 3, the first video frame structure may be PBBB, or when the threshold for B-frame number is 4, the first video frame structure may be PBBBB.

Step 402, replacing a B frame corresponding to a designated position in the first video frame structure with a P frame, to obtain the second video frame structure.

In the present embodiment, the designated position may be a middle position of the first video frame structure, where the number of frames of the first video frame structure may be an odd number or an even number. When the number of frames of the first video frame structure is an odd number, the designated position is a position corresponding to the number of frames of the first video frame structure divided by two and rounded and then plus one. When the number of frames of the first video frame structure is an even number, the designated position is a position corresponding to the number of frames of the first video frame structure divided by two, or a position corresponding to the number of frames divided by two and then plus one. Here, the number of frames of the first video frame structure is a sum of the number of P frames and the number of B frames, that is, one plus the pre-set threshold for the B-frame number.

Alternatively, after the first video frame structure is determined, the second video frame structure may also be a structure with a P frame added after a target position. When the number of frames of the first video frame structure is an even number, the target position may be a position obtained by dividing the number of frames of the first video frame structure by two. For example, the number of frames of the first video frame structure is four, then the target position is two, corresponding to the second frame, in this regard, a P frame is added after the second frame of the first video frame structure, to obtain the second video frame structure. When the number of frames of the first video frame structure is an odd number, the target position may be a position obtained by dividing the number of frames of the first video frame structure by two and rounded, or may be a position obtained by dividing the number of frames of the first video frame structure by two and rounded and then plus one. For example, the number of frames of the first video frame structure is five, the target position is two or three, corresponding to the second frame and the third frame, in this regard, a P frame is added after the second frame of the first video frame structure to obtain the second video frame structure; or in this regard, a P frame is added after the third frame of the first video frame structure to obtain the second video frame structure.

Step 403, in response to determining that the first video frame structure and/or the second video frame structure does not meet the pre-set condition, determining the target video frame structure from the first video frame structure and the second video frame structure.

In the present embodiment, if the first video frame structure and/or the second video frame structure does not meet the preset condition, it indicates that at least one of the first video frame structure and the second video frame structure is capable of matching the current video coding scenario. In this regard, the target video frame structure may be determined from the first video frame structure and the second video frame structure.

In some alternative implementations of the present embodiment, the determining the target video frame structure from the first video frame structure and the second video frame structure, may include: pre-coding the video frames in the to-be-coded video frame sequence according to the first video frame structure and the second video frame structure respectively, and determining a first coding parameter corresponding to the first video frame structure and a second coding parameter corresponding to the second video frame structure; and determining the target video frame structure based on the first coding parameter and the second coding parameter.

Here, the manners for determining the first coding parameter corresponding to the first video frame structure and the second coding parameter corresponding to the second video frame structure may include: during the precoding, determining a first number of bits consumed by the precoding corresponding to the first video frame structure and a first proportion of intra-frame block, and determining a second number of bits consumed by the precoding corresponding to the second video frame structure and a second proportion of intra-frame block; calculating a sum of a product of the first number of bits consumed by the precoding and a first weight value and a product of the first proportion of intra-frame block and a second weight value, to obtain the first coding parameter; calculating a sum of a product of the second number of bits consumed by the precoding and the first weight value and a product of the second proportion of intra-frame block and the second weight value, to obtain the second coding parameter. Further, the method for determining the target video frame structure based on the first coding parameter and the second coding parameter may include: determining a video frame structure corresponding to a smaller coding parameter in the first coding parameter and the second coding parameter as the target video frame structure.

Step 404, in response to determining that the first video frame structure and the second video frame structure both meet the pre-set condition, determining a video frame structure set based on the threshold for the B-frame number.

In the present embodiment, if both the first video frame structure and the second video frame structure meet the pre-set condition, it indicates that neither the first video frame structure nor the second video frame structure conforms to the current video coding scenario. Then, a target video frame structure needs to be determined from other video frame structures. Here, the video frame structure set may be determined based on the threshold for the B-frame number. For example, video frame structures in the video frame structure set may include all combinations of B frames, from a video frame structure composed of the minimum number of B frames to a video frame structure composed of a target number of B frames. The target number may be obtained by multiplying the number of frames of the video frame structure which corresponding to the threshold for B-frame number and a pre-set ratio and then minus one. For example, the pre-set ratio may be one of fourth. For example, when the threshold for the B-frame number is 11, the number of frames of the video frame structure corresponding to the threshold for B-frame number is 12. In this regard, the target number may be 2. That is, search in other video frame structures for the video frame structures having the number of B frames of 0, 1, and 2. In this circumstance, the video frame structures in the video frame structure set include the video frame structures having the number of B frames of 0, 1, and 2.

Step 405, determining a target video frame structure from the video frame structure set.

In the present embodiment, by traversal searching the video frame structures in the video frame structure set, the various video frame structures may be used to pre-code video frames in the to-be-coded video frame, and based on the pre-coding results, an optimal target video frame structure may be determined from the video frame structure set.

In some alternative implementations of the present embodiment, the determining the target video frame structure from the video frame structure set, may include: for each video frame structure in the video frame structure set, pre-coding the video frames in the to-be-coded video frame sequence according the video frame structure, and determining a third coding parameter corresponding to the video frame structure; and determining the target video frame structure from the video frame structure set based on third coding parameters corresponding to the various video frame structures.

In the present embodiment, for each video frame structure in the video frame structure set, the video frames in the to-be-coded video frame sequence are pre-coded according to the video frame structure, and a coding parameter such as the number of bits may be determined as the third coding parameter. Since pre-coding performance of each video frame structure may be described based on the third coding parameter, the target video frame structure may be determined from the video frame structure set based on the third coding parameter.

In some alternative implementations of the present embodiment, the third coding parameter may include the number of bits; and the determining the target video frame structure from the video frame structure set, based on the third coding parameter, may include: in response to determining that a video frame structure consuming a minimum number of bits in the video frame structure set is a pre-set third video frame structure, pre-coding the video frames in the to-be-coded video frame sequence according to a pre-set fourth video frame structure, and determining the number of bits corresponding to the fourth video frame structure; and in the third video frame structure and the fourth video frame structure, determining the one consuming a smaller number of bits as the target video frame structure.

In the present embodiment, the third coding parameter may be the number of bits, and the number of bits may be the number of bits consumed by inter-frame coding. In this regard, in response to determining that the video frame structure consuming the minimum number of bits in the video frame structure set is the pre-set third video frame structure, the video frames in the to-be-coded video frame sequence may be pre-coded according to the pre-set fourth video frame structure, and the number of bits corresponding to the fourth video frame structure may be determined. The preset third video frame structure may be a video frame structure composed of full P frames where the number of B frames is zero, and the preset fourth video frame structure may be a PBPB structure composed of one P frame and one B frame. Since the full P frames is usually not the optimal video frame structure, when the video frame structure consuming the minimum number of bits is the video frame structure composed of full P frames, it is necessary to additionally compare the number of bits consumed thereby with the number of bits consumed by the PBPB structure, and the video frame structure consuming the smaller number of bits is selected and determined as the target video frame structure.

Step 406, coding the video frames in the to-be-coded video frame sequence according to the target video frame structure.

In the present embodiment, for the description of step 406, reference may be made to step 203, and detailed description thereof will be omitted.

It can be seen from FIG. 4 that, compared with the embodiment corresponding to FIG. 2, the flow 400 of the method for coding a video in the present embodiment may also determine, in response to determining that the first video frame structure and/or the second video frame structure does not meet the pre-set condition, the target video frame structure from the first video frame structure and the second video frame structure, so that, the target video frame structure is determined from the first video frame structure and the second video frame structure when the first video frame structure and/or the second video frame structure is capable of meeting the current video coding scenario. The method for coding a video may also determine the target video frame structure from the video frame structure set in response to determining that the first video frame structure and the second video frame structure both meet the pre-set condition. In this process, only when the first video frame structure and the second video frame structure cannot meet the current video coding scenario, a traversal search in a small range may be performed in the video frame structure set, to balance a relationship between complexity and an optimal solution, and thus determining the most accurate video frame structure for video coding with low algorithm complexity, thereby improving video coding performance.

Figure 5:
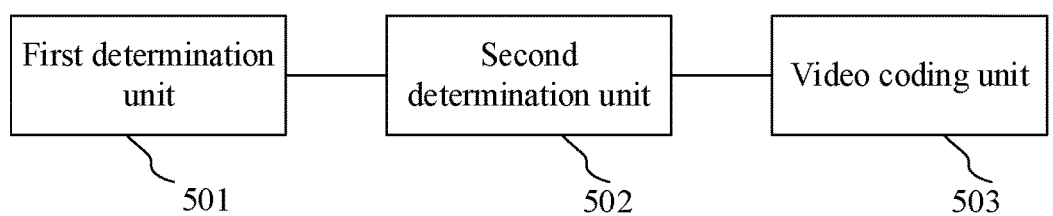
FIG. 5 is a schematic structural diagram of an apparatus for coding a video according to an embodiment of the present disclosure.

With further reference to FIG. 5, as an implementation of the method shown in the above figures, an embodiment of the present disclosure provides an apparatus for coding a video, and the embodiment of the apparatus corresponds to the embodiment of the method as shown in FIG. 2, and the apparatus may be applied to various electronic devices.

As shown in FIG. 5, the apparatus 500 for coding a video of the present embodiment includes: a first determination unit 501, a second determination unit 502 and a video coding unit 503.

The first determination unit 501 is configured to determine a first video frame structure and a second video frame structure based on a pre-set threshold for a B-frame number.

The second determination unit 502 is configured to determine a target video frame structure based on the first video frame structure, the second video frame structure, and a pre-set condition.

The video coding unit 503 is configured to code video frames in a to-be-coded video frame sequence according to the target video frame structure.

In some alternative implementations of the present embodiment, the second determination unit 502 is further configured to: in response to determining that the first video frame structure and/or the second video frame structure does not meet the pre-set condition, determine the target video frame structure from the first video frame structure and the second video frame structure.

In some alternative implementations of the present embodiment, the second determination unit 502 is further configured to: pre-code the video frame in the to-be-coded video frame sequence according to the first video frame structure and the second video frame structure respectively, and determining a first coding parameter corresponding to the first video frame structure and a second coding parameter corresponding to the second video frame structure; and determine the target video frame structure based on the first coding parameter and the second coding parameter.

In some alternative implementations of the present embodiment, the second determination unit 502 is further configured to: in response to determining that the first video frame structure and the second video frame structure both meet the pre-set condition, determine a video frame structure set based on the threshold for the B-frame number; and determine the target video frame structure from the video frame structure set.

In some alternative implementations of the present embodiment, the second determination unit 502 is further configured to: for each video frame structure in the video frame structure set, pre-code the video frames in the to-be-coded video frame sequence according to the video frame structure, and determine a third coding parameter corresponding to the video frame structure; and determine the target video frame structure from the video frame structure set based on the third coding parameter.

In some alternative implementations of the present embodiment, the third coding parameter is the number of bits; and the second determination unit 502 is further configured to: in response to determining that a video frame structure consuming a minimum number of bits in the video frame structure set is a pre-set third video frame structure, pre-code the video frames in the to-be-coded video frame sequence according to a pre-set fourth video frame structure, and determine a number of bits corresponding to the fourth video frame structure; and determine, in the third video frame structure and the fourth video frame structure, a video frame structure consuming a smaller number of bits as the target video frame structure.

In some alternative implementations of the present embodiment, the first determination unit 501 is further configured to: determine a video frame structure as the first video frame structure, the determined video frame structure having a number of B frames equal to the threshold for the B-frame number; and replace a B frame corresponding to a designated position in the first video frame structure with a P frame, to obtain the second video frame structure.

It should be understood that the units 501 to 503 in the apparatus 500 for coding a video respectively correspond to the steps in the method described with reference to FIG. 2. Therefore, the operations and features described above for the method for coding a video are also applicable to the apparatus 500 and the units included therein, and detailed description thereof will be omitted.

According to an embodiment of the present disclosure, some embodiments of the present disclosure also provide an electronic device and a readable storage medium.

Figure 6:
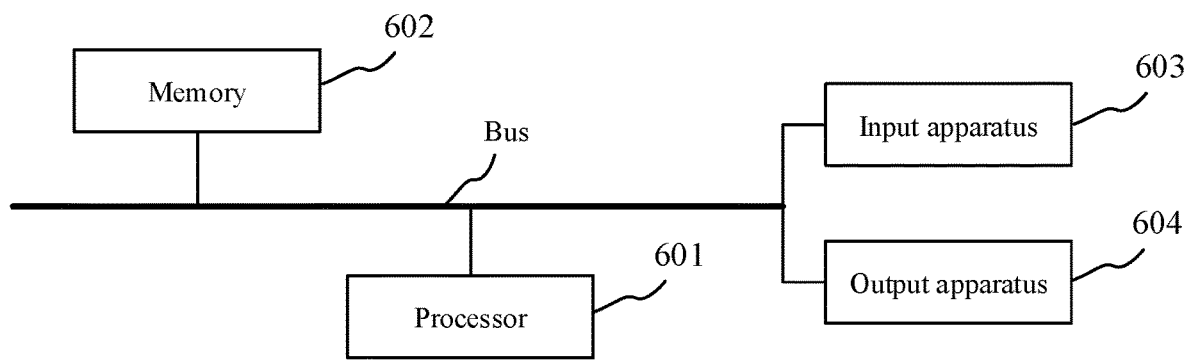
FIG. 6 is a block diagram of a device for coding a video used to implement the method for coding a video according to an embodiment of the present disclosure.

Further reference to FIG. 6, illustrating a block diagram of a device for coding a video used to implement the method for coding a video according to an embodiment of the present disclosure. The device for coding a video includes: one or more processors 601, a memory 602, and interfaces for connecting various components, including high-speed interfaces and low-speed interfaces. The various components are connected to each other using different buses, and may be installed on a common motherboard or in other methods as needed. The processor may process instructions executed within the device, including instructions stored in or on the memory to display graphic information of GUI on an external input/output apparatus (such as a display device coupled to the interface). In other embodiments, a plurality of processors and/or a plurality of buses may be used together with a plurality of memories and a plurality of memories if desired. Similarly, a plurality of devices may be connected, and the devices provide some necessary operations. In FIG. 6, one processor 601 is used as an example.

The memory 602 is a non-transitory computer readable storage medium provided by an embodiments of the present disclosure. The memory stores instructions executable by at least one processor, so that the at least one processor performs the method for coding a video provided by embodiments of the present disclosure. The non-transitory computer readable storage medium of the present disclosure stores computer instructions for causing a computer to perform the method for coding a video provided by embodiments of the present disclosure.

The memory 602, as a non-transitory computer readable storage medium, may be used to store non-transitory software programs, non-transitory computer executable programs and modules, such as program instructions/modules corresponding to the method for coding a video in embodiments of the present disclosure (for example, the first determination unit 501, the second determination unit 502 and the video coding unit 503 as shown in FIG. 5). The processor 601 executes the non-transitory software programs, instructions, and modules stored in the memory 602 to execute various functional applications and data processing of the device, that is, to implement the method for coding a video in the foregoing method embodiments.

The memory 602 may include a storage program area and a storage data area, where the storage program area may store an operating system and at least one function required application program; and the storage data area may store data created by the use of the electronic device, etc. In addition, the memory 602 may include a high-speed random access memory, and may also include a non-transitory memory, such as at least one magnetic disk storage device, a flash memory device, or other non-transitory solid-state storage devices. In some embodiments, the memory 602 may optionally include memories remotely provided with respect to the processor 601, and these remote memories may be connected to the electronic device through a network. Examples of the above network include but are not limited to the Internet, intranet, local area network, mobile communication network, and combinations thereof.

The video coding device may further include: an input apparatus 603 and an output apparatus 604. The processor 601, the memory 602, the input apparatus 603, and the output apparatus 604 may be connected through a bus or in other methods. In FIG. 6, connection through a bus is used as an example.

The input apparatus 603 may receive input digital or character information, and generate key signal inputs related to user settings and function control of the electronic device for encoding a video, such as touch screen, keypad, mouse, trackpad, touchpad, pointing stick, one or more mouse buttons, trackball, joystick and other input apparatuses. The output apparatus 604 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) include machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user.

The systems and technologies described herein may be implemented in a computing system that includes backend components (e.g., as a data server), or a computing system that includes middleware components (e.g., application server), or a computing system that includes frontend components (for example, a user computer having a graphical user interface or a web browser, through which the user may interact with the implementations of the systems and the technologies described herein), or a computing system that includes any combination of such backend components, middleware components, or frontend components. The components of the system may be interconnected by any form or medium of digital data communication (e.g., communication network). Examples of the communication network include: local area networks (LAN), wide area networks (WAN), the Internet, and blockchain networks.

The computer system may include a client and a server. The client and the server are generally far from each other and usually interact through the communication network. The relationship between the client and the server is generated by computer programs that run on the corresponding computer and have a client-server relationship with each other.

According to the solution provided in embodiments of the present disclosure, a method for video coding is provided, which is capable of improving the video coding performance.

It should be understood that the various forms of processes shown above may be used to reorder, add, or delete steps. For example, the steps described in embodiments of present disclosure may be performed in parallel, sequentially, or in different orders. As long as the desired results of the technical solution disclosed in embodiments of the present disclosure can be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for coding a video, the method comprising:
determining, based on a pre-set threshold for a B-frame number, a first video frame structure and a second video frame structure,
wherein the determining the first video frame structure and the second video frame structure based on the pre-set threshold for the B-frame number, comprises:
determining a video frame structure as the first video frame structure, the first video frame structure having a first number of consecutive B frames equal to the pre-set threshold for the B-frame number; and
replacing a B frame corresponding to a designated position in the first video frame structure with a P frame, to obtain the second video frame structure having a second number of consecutive B frames;
determining a target video frame structure based on the first video frame structure, the second video frame structure, and a pre-set condition, wherein the determining the target video frame structure based on the first video frame structure, the second video frame structure, and the pre-set condition, comprises:
in response to determining that the first video frame structure and the second video frame structure both meet the pre-set condition, determining a video frame structure set, and determining the target video frame structure from the video frame structure set, wherein the video frame structure set comprises video frame structures each having a number of consecutive B frames, and numbers of consecutive B frames of the video frame structures in the video frame structure set comprise integers from zero to a target number, wherein the target number is obtained by subtracting one from a product of the first number and a pre-set ratio, and is different from the first number and the second number; and
coding video frames in a to-be-coded video frame sequence according to the target video frame structure.

2. The method for coding a video according to claim 1, wherein determining the target video frame structure based on the first video frame structure, the second video frame structure, and the pre-set condition comprises:
in response to determining that the first video frame structure and/or the second video frame structure does not meet the pre-set condition, determining the target video frame structure from the first video frame structure and the second video frame structure.

3. The method for coding a video according to claim 2, wherein determining the target video frame structure from the first video frame structure and the second video frame structure comprises:
- pre-coding the video frames in the to-be-coded video frame sequence according to the first video frame structure and the second video frame structure respectively;
- determining a first coding parameter corresponding to the first video frame structure and a second coding parameter corresponding to the second video frame structure; and
- determining the target video frame structure based on the first coding parameter and the second coding parameter.

4. The method for coding a video according to claim 1, wherein determining the target video frame structure from the video frame structure set comprises:
- for each video frame structure in the video frame structure set, pre-coding the video frames in the to-be-coded video frame sequence according to the video frame structure;
- determining a third coding parameter corresponding to the video frame structure; and
- determining the target video frame structure from the video frame structure set based on the third coding parameter.

5. The method for coding a video according to claim 4, wherein the third coding parameter is a number of bits, and wherein determining the target video frame structure from the video frame structure set based on the third coding parameter comprises:
- in response to determining that a video frame structure consuming a minimum number of bits in the video frame structure set is a pre-set third video frame structure, pre-coding the video frames in the to-be-coded video frame sequence according to a pre-set fourth video frame structure and determining a number of bits corresponding to the pre-set fourth video frame structure; and
- determining, in the pre-set third video frame structure and the pre-set fourth video frame structure, a video frame structure consuming a smaller number of bits as the target video frame structure.

6. A device for coding a video, the device comprising:
one or more processors; and
a storage apparatus, storing one or more programs thereon, the one or more programs, when executed by the one or more processors, causing the one or more processors to implement operations, the operations comprising:
- determining, based on a pre-set threshold for a B-frame number, a first video frame structure and a second video frame structure,
  wherein the determining the first video frame structure and the second video frame structure based on the pre-set threshold for the B-frame number, comprises:
  - determining a video frame structure as the first video frame structure, the first video frame structure having a first number of consecutive B frames equal to the pre-set threshold for the B-frame number; and
  - replacing a B frame corresponding to a designated position in the first video frame structure with a P frame, to obtain the second video frame structure having a second number of consecutive B frames;
- determining a target video frame structure based on the first video frame structure, the second video frame structure, and a pre-set condition, wherein the determining the target video frame structure based on the first video frame structure, the second video frame structure, and the pre-set condition, comprises:
  - in response to determining that the first video frame structure and the second video frame structure both meet the pre-set condition, determining a video frame structure set, and determining the target video frame structure from the video frame structure set, wherein the video frame structure set comprises video frame structures each having a number of consecutive B frames, and numbers of consecutive B frames of the video frame structures in the video frame structure set comprise integers from zero to a target number, wherein the target number is obtained by subtracting one from a product of the first number and a pre-set ratio, and is different from the first number and the second number; and
- coding video frames in a to-be-coded video frame sequence according to the target video frame structure.

7. The device according to claim 6, wherein determining the target video frame structure based on the first video frame structure, the second video frame structure, and the pre-set condition comprises:
- in response to determining that the first video frame structure and/or the second video frame structure does not meet the pre-set condition, determining the target video frame structure from the first video frame structure and the second video frame structure.

8. The device according to claim 7, wherein determining the target video frame structure from the first video frame structure and the second video frame structure comprises:
- pre-coding the video frames in the to-be-coded video frame sequence according to the first video frame structure and the second video frame structure respectively;
- determining a first coding parameter corresponding to the first video frame structure and a second coding parameter corresponding to the second video frame structure; and
- determining the target video frame structure based on the first coding parameter and the second coding parameter.

9. The device according to claim 6, wherein determining the target video frame structure from the video frame structure set comprises:
- for each video frame structure in the video frame structure set, pre-coding the video frames in the to-be-coded video frame sequence according to the video frame structure;
- determining a third coding parameter corresponding to the video frame structure; and
- determining the target video frame structure from the video frame structure set based on the third coding parameter.

10. The device according to claim 9, wherein the third coding parameter is a number of bits, and wherein determining the target video frame structure from the video frame structure set based on the third coding parameter comprises:
- in response to determining that a video frame structure consuming a minimum number of bits in the video frame structure set is a pre-set third video frame structure, pre-coding the video frames in the to-becoded video frame sequence according to a pre-set fourth video frame structure and determining a number of bits corresponding to the pre-set fourth video frame structure; and determining, in the pre-set third video frame structure and the pre-set fourth video frame structure, a video frame structure consuming a smaller number of bits as the target video frame structure.

11. The method for coding a video according to claim 1, wherein the pre-set condition comprises at least one of the following conditions that:

a proportion of intra-frame block in inter-frame coding exceed a first threshold;

a ratio of an average number of bits consumed by the B frame to an average number of bits consumed by the P frame exceeds a second threshold;

a variance of a motion vector in inter-frame coding is greater than a third threshold, and a number of target blocks is greater than a fourth threshold; or a variance of the motion vector in inter-frame coding is less than a fifth threshold, a kurtosis of the motion vector is greater than a sixth threshold, a sum of a cumulative motion vector and a standard deviation is less than a seventh threshold, and the number of target blocks is greater than an eighth threshold.

12. The method for coding a video according to claim 11, wherein a value of the seventh threshold is determined based on a maximum absolute value of the motion vector.

13. The method for coding a video according to claim 1, wherein the first video frame structure and the second video frame structure both meet the pre-set condition, and the pre-set ratio is smaller than 1.

14. A non-transitory computer-readable storage medium storing computer instructions, the computer instructions, executable to cause a computer to perform operations, the operations comprising:

determining, based on a pre-set threshold for a B-frame number, a first video frame structure and a second video frame structure, wherein the determining the first video frame structure and the second video frame structure based on the pre-set threshold for the B-frame number, comprises:

determining a video frame structure as the first video frame structure, the first video frame structure having a first number of consecutive B frames equal to the pre-set threshold for the B-frame number; and replacing a B frame corresponding to a designated position in the first video frame structure with a P frame, to obtain the second video frame structure having a second number of consecutive B frames;

determining a target video frame structure based on the first video frame structure, the second video frame structure, and a pre-set condition, wherein the determining the target video frame structure based on the first video frame structure, the second video frame structure, and the pre-set condition, comprises:

in response to determining that the first video frame structure and the second video frame structure both meet the pre-set condition, determining a video frame structure set, and determining the target video frame structure from the video frame structure set, wherein the video frame structure set comprises video frame structures each having a number of consecutive B frames, and numbers of consecutive B frames of the video frame structures in the video frame structure set comprise integers from zero to a target number, wherein the target number is obtained by subtracting one from a product of the first number and a pre-set ratio, and is different from the first number and the second number; and coding video frames in a to-be-coded video frame sequence according to the target video frame structure.

15. The non-transitory computer-readable storage medium according to claim 14, wherein determining the target video frame structure based on the first video frame structure, the second video frame structure, and the pre-set condition comprises:

in response to determining that the first video frame structure and/or the second video frame structure does not meet the pre-set condition, determining the target video frame structure from the first video frame structure and the second video frame structure.

16. The non-transitory computer-readable storage medium according to claim 15, wherein determining the target video frame structure from the first video frame structure and the second video frame structure comprises:

pre-coding the video frames in the to-be-coded video frame sequence according to the first video frame structure and the second video frame structure respectively;

determining a first coding parameter corresponding to the first video frame structure and a second coding parameter corresponding to the second video frame structure; and determining the target video frame structure based on the first coding parameter and the second coding parameter.

17. The non-transitory computer-readable storage medium according to claim 14, wherein determining the target video frame structure from the video frame structure set comprises:

for each video frame structure in the video frame structure set, pre-coding the video frames in the to-be-coded video frame sequence according to the video frame structure;

determining a third coding parameter corresponding to the video frame structure; and determining the target video frame structure from the video frame structure set based on the third coding parameter.

18. The non-transitory computer-readable storage medium according to claim 17, wherein the third coding parameter is a number of bits, and wherein determining the target video frame structure from the video frame structure set based on the third coding parameter, comprises:

in response to determining that a video frame structure consuming a minimum number of bits in the video frame structure set is a pre-set third video frame structure, pre-coding the video frames in the to-be-coded video frame sequence according to a pre-set fourth video frame structure and determining a number of bits corresponding to the pre-set fourth video frame structure; and determining, in the pre-set third video frame structure and the pre-set fourth video frame structure, a video frame structure consuming a smaller number of bits as the target video frame structure.

* * * * *